United States Patent
Blackshear et al.

[11] Patent Number: 6,013,107
[45] Date of Patent: Jan. 11, 2000

[54] DYNAMIC MAPPING OF USER ID INTO TCP/IP ADDRESS WITHOUT USER INTERACTION AS USER SIGNING ON OR SINGING OFF AMONG WORKSTATIONS

[75] Inventors: Susan Louise Blackshear, Charlotte; Dennis David Leak, Kannapolis; Jody Lynn Mace, Charlotte, all of N.C.

[73] Assignee: International Business Machines Corporation, Armonk, N.Y.

[21] Appl. No.: 08/944,466

[22] Filed: Oct. 6, 1997

[51] Int. Cl.[7] .................................................. G06F 13/00
[52] U.S. Cl. ......................... 703/229; 709/230; 713/201; 713/202
[58] Field of Search ................... 713/201, 202; 709/229, 230

[56] References Cited

U.S. PATENT DOCUMENTS

| | | |
|---|---|---|
| 5,021,949 | 6/1991 | Morten et al. . |
| 5,159,592 | 10/1992 | Perkins .................................. 370/338 |
| 5,410,543 | 4/1995 | Seitz et al. ............................. 370/463 |
| 5,515,508 | 5/1996 | Pettus et al. .......................... 709/227 |
| 5,598,536 | 1/1997 | Slaughter, III et al. . |
| 5,812,819 | 9/1998 | Rodwin et al. ....................... 395/500 |
| 5,884,024 | 3/1999 | Lim et al. .............................. 713/201 |

*Primary Examiner*—Krisna Lim
*Attorney, Agent, or Firm*—A. P. Tennent; K. O. Hesse

[57] ABSTRACT

Method, apparatus and system is disclosed for providing TCP/IP addresses from a dynamic user identification server to workstations running an application program so that messages can be sent from one operator to another operator regardless of which workstation the other operator may be using, without the need to send the message itself through a server station. The dynamic user identification server also keeps track of the number of workstations in use at any one time and the number of copies of a licensed program being used for royalty control.

16 Claims, 9 Drawing Sheets

DYNAMIC MAPPING OF USER ID INTO TCP/IP ADDRESS WITHOUT USER INTERACTION AS USER SIGNING ON OR SINGING OFF AMONG WORKSTATIONS

TECHNICAL FIELD

This invention relates to communication between users of computers each computer having a continuously running computer application program that allows users to sign on and off the computer application program without stopping the computer application program. Communication occurs over a network using a packet switched network and may also include an internetting protocol.

BACKGROUND OF THE INVENTION

In many current application programs such as used in teller banking applications, the application program is started in the morning and continues to run all day. As operators change places during the day, different tellers can sign off and on to the workstation application and can communicate with other workstation computers using the operators identification. An example is when a teller using such an application calls over a supervisor to override a limit. The supervisor approves the override request on the teller workstation by entering the supervisors ID and password to perform the override functions. In extended applications the supervisor can perform the override functions by communicating them in a message from another computer workstation onto which the supervisor is signed on.

The communication network allowing such remote supervisor override must maintain operator ID integrity as operators including supervising operators sign on and off of various computer workstations in the network. Current communication networks use operator ID and password to accomplish such integrity, and to address messages between workstations, allowing several operators to use a computer application program simultaneously or in seriatim without re-configuring the network. An example of such a computer workstation application program is the IBM SAA Consumer Transaction program product.

It is desired to use a transmission control program/internet protocol (TCP/IP) network to connect computers over local area networks as well as between such networks and host computers, the computers also being required to run the computer application program identified above, or equivalent programs, serving a number of operators without compromising operator identification integrity. TCP/IP networks do not use operator identification however, but instead use an IP address or a host name, neither of which can be changed without stopping, re-configuring, and restarting TCP/IP in the workstations as operators change workstations. Each change also requires that the workstation computer application program also be stopped and restarted.

U.S. Pat. No. 5,021,949 to R. M. Morten et al. describes linking SNA host computers together over a packet switched network such as the Defense Data Network (DDN). A problem continues to exist with this approach to the current objective in that as operators sign on and off of a host computer, other operators and their host computers do not have the proper information to place in the internetting protocol (IP) header so that the message goes to proper host.

U.S. Pat. No. 5,598,536 describes a way, for a person, maintaining a database shown in table 1, to assign an internetting protocol (IP) address to each remote user that accesses a local computer network. A remote access server computer ensures that each "authorized" user receives the same unique IP address each time that the user makes a remote access connection, even though the connection may be made from different computers at different locations. This allows employees who travel or who work at home to consistently access the company computer network. If the accessing computer is already operating under a different IP address TCP/IP must be stopped and restarted in that computer. Also it can only serve one operator at a time since a workstation computer can not have more than one IP address at a time. Another limitation of this prior art patent is that a person must manually update the database and assign an IP address to each operator.

SUMMARY OF THE INVENTION

These and other limitations of the prior art IP addressing methods are overcome in the instant invention which has the advantage that a supervisor may move from workstation to workstation, each having a different IP address without requiring that the network or any of the workstations be stopped, reconfigured and restarted in order to retain addressing and operator identification integrity.

A further advantage of the invention is that by means of the dynamic user ID (DU) server, each workstation can remain in operation with the same IP address yet operators can move from one workstation to another and receive messages directly from other workstations without the need to receive, store and forward the entire message at an intermediate server. This direct transmission of messages from one workstation to another reduces communication flow through the intermediate server.

A still further advantage of the invention is that the dynamic mapping of user ID into an IP address occurs automatically and without user interaction as a user signs on to a workstation or signs off of one workstation and onto another workstation.

These and other advantages that will be apparent from the following specification are obtained by providing a dynamic user ID (DU) server program in a continuously running computer, and a dynamic user ID (DU) client program in each workstation computer that is to obtain the benefits of the invention. In an alternate embodiment, workstations may be grouped into a number of locations, such as bank branches, and connected together at each location by a local area network (LAN). One of the workstations at each location will, according to the invention, have a DU server program running in its computer. Other workstations at another location may also be grouped into a local area network and have a DU server program running in a computer of one of the workstations in this other group. Each of these groups of workstations can operate autonomously if communication outside of a group is lost but ordinarily, one of the DU servers will be designated as the main DU server. Often the main DU server will be located at a headquarters branch. The main DU server will, according to this embodiment of the invention, keep track of all of the operators to which messages are to be sent, in all of the groups.

An additional benefit of the main DU server is that it can be used to keep track of the number of workstations in use at any one time and therefore the number of copies of a licensed program being used for royalty control. Other benefits and advantages of the invention will become apparent upon reading the detailed description of the preferred embodiment.

DETAILED DESCRIPTION OF THE PREFERRED EMBODIMENT

Figure 1:
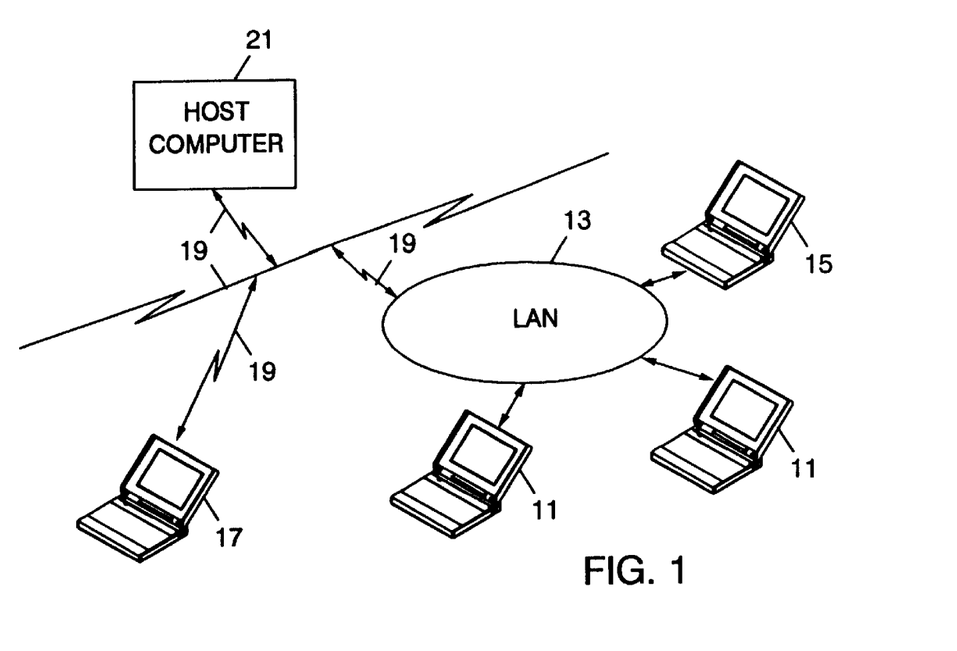
FIG. 1 shows a diagram of the environment of the workstations according to the invention.

Referring now to FIG. 1, the environment in which the invention finds utility according to a preferred embodiment of the invention is shown in a network diagram. A number of workstations 11 are connected to a local area communication network (LAN) 13. One of the workstations 15 runs continuously during operation of the network and includes a file server program. Workstation 15 acts as a server computer for the workstations of the network and maintains the master files for the applications being run on the network. In this way, any operator at any workstation can serve a customer and obtain up to date network control information, and in some cases, customer information from the files of workstation 15. Usually, consumer master accounts and other consumer information is kept at a host computer 21.

The workstations 11 and 15 may be part of a local branch bank A for example. In addition to workstations 11 and 15, the branch bank A may have a remote teller at a supermarket or shopping center who uses a workstation 17 connected to LAN 13 by a phone line or other communication path 19. The teller at workstation 17 may be in most need of remote supervisor override functions since that teller is alone at the remote location and, being out of sight range, the teller at workstation 17 will not know which workstations 11 have a supervisor signed on and therefore will not know an internetting address for a supervisor.

The workstation 15 or another continuously operating workstation includes a DU server program of the invention. Workstation 15 is designated as a local DU server for branch A. Each workstation 11 and 17 includes a DU client program of the invention. These programs will be described later in detail with respect to FIGS. 10, 11 and 12.

Figure 2:
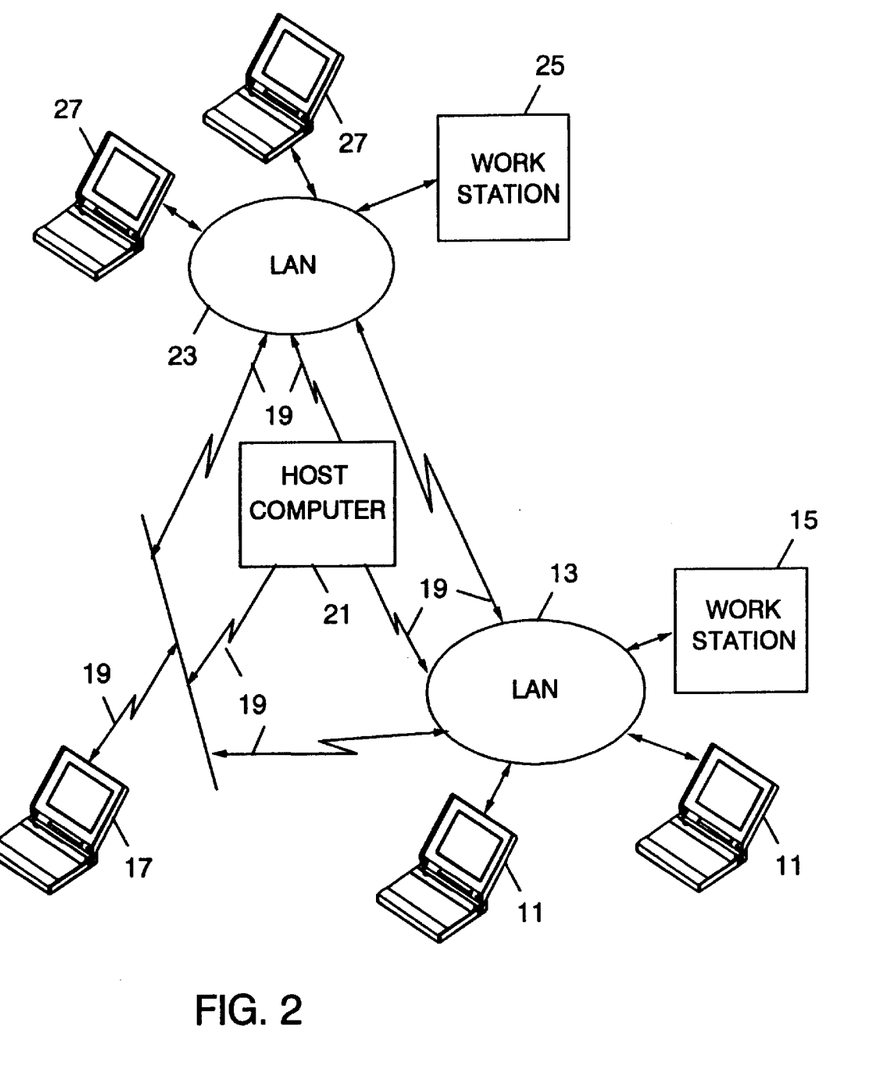
FIG. 2 shows a diagram of an alternate embodiment including multiple groups of workstations according to the invention.

FIG. 2 is a diagram of an alternate embodiment including multiple groups of workstations according to the invention which could be for example serving multiple branches of a bank. It will be recognized that although this example relates to financial institutions, the invention has much broader application and is not limited by the use to which the system is put.

FIG. 2 shows the workstations 11, 15 and 17 at branch A as well as the LAN 13 and communication paths 19 which provide the connections between LAN 13, workstation 17 and host computer 21. FIG. 2 also shows a second LAN 23 at a branch B. Lan 23 connects workstations 27 and workstation 25 to each other and to communication path 19. Workstation 25 contains a DU server program of the invention and is designated as the main name DU server in the multiple groups of workstations. As in FIG. 1, LAN 13 in FIG. 2 has a local name DU server at workstation 15. The communications path 19 connects LAN 13, LAN 23 and workstation 17 to each other and also to host computer 21 where most of the master files for the application are stored.

Figure 3:
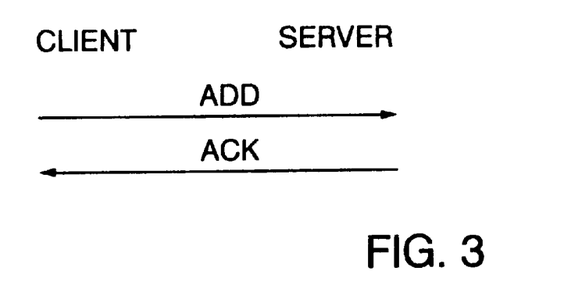
FIG. 3 is a sign on message flow diagram.

FIG. 3 shows a sign on message flow diagram where the ADD message is sent from a workstation 11 to a server 15 for example. Each workstation 11 and 17 has the address of server 15 stored in its communication control program. The ADD message includes the operator ID, the operator's encrypted password and the IP address of the workstation at which the operator has signed on. The server 15 receives the operator ID, the operator's encrypted password and the IP address of the workstation at which the operator has signed on and stores these data items in an operator list. After storing the data items, the DU server sends back an acknowledge message to indicate completion of the ADD request.

Figure 4:
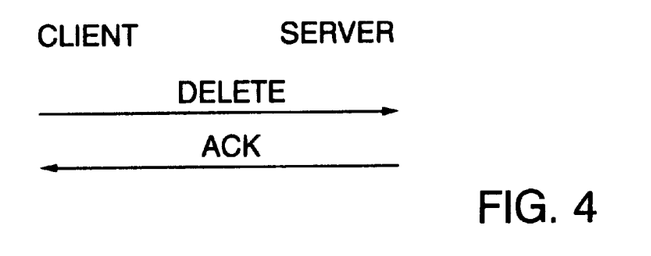
FIG. 4 is a sign off message flow diagram.

FIG. 4 shows a sign off message flow diagram where the DELETE message is sent from a workstation 11 to a server 15 for example. The server 15 receives the operator ID in the DELETE request and deletes the operator ID, the operator's encrypted password and the IP address of the workstation at which the operator was signed on data items from the operator DU list. After deleting the data items, the server sends back an acknowledge message to indicate completion of the DELETE request.

Figure 5:
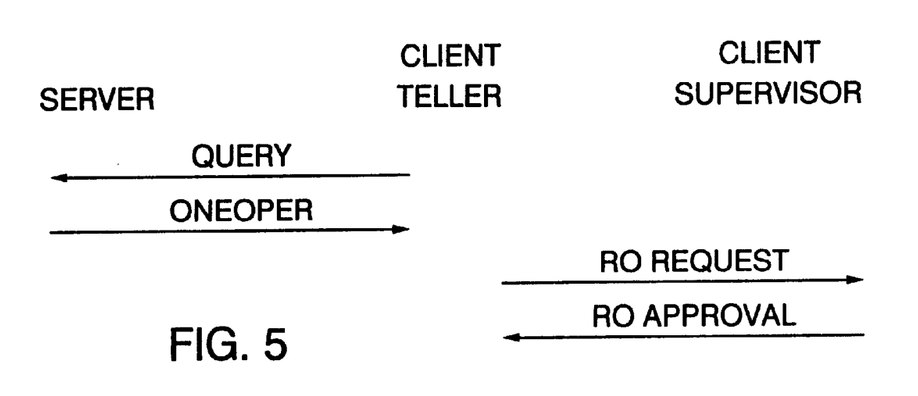
FIG. 5 is a message flow diagram according to one embodiment of the invention.

FIG. 5 is a message flow diagram for a remote override request according to one embodiment of the invention. In this embodiment, a teller at a workstation 11 for example, knows that a supervisor is signed on to another workstation 11 and sends a QUERY message including the supervisors operator ID to the server 15. The server workstation 15 responds with a ONEOPER message including the operator ID, encrypted password and IP address of the supervisors workstation.

The teller can then send a remote override (RO) request directly to the supervisors workstation. When the supervisor responds to the RO, the supervisor will enter operator ID and password which will be encrypted at the supervisors workstation and included in a RO APPROVAL message back to the workstation 11 of the requesting teller. The application in the requesting teller workstation 11 compares the encrypted passwords from server 15 and from the supervisor before acting on the override approval message. In this way operator ID integrity is maintained across the system while allowing remote override functions to be performed by supervisors who may move from one workstation to one or more other workstations over the course of a work period.

Figure 6:
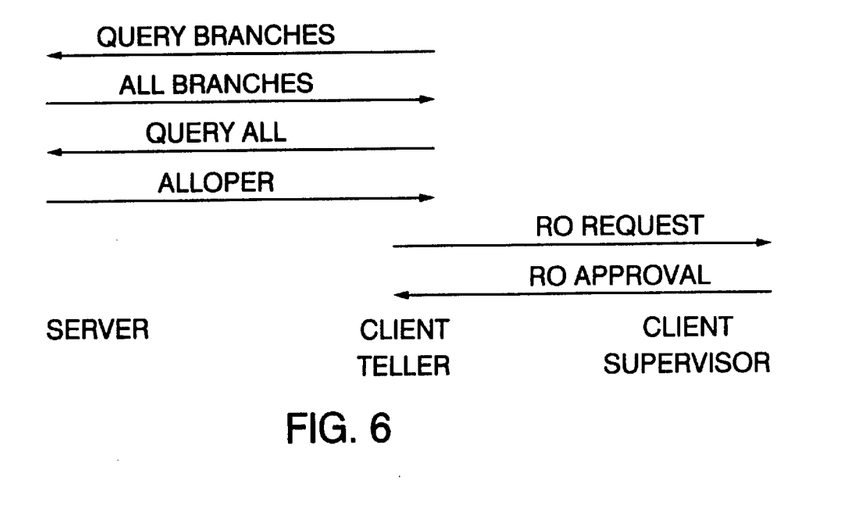
FIG. 6 is a message flow diagram according to another embodiment of the invention.

FIG. 6 is a message flow diagram according to another embodiment of the invention. In FIG. 6, the teller, for example at workstation 17, is not able to know the identity of a supervisor and causes workstation 17 to issue a QUERY BRANDHES request. The server 15 responds with an ALL-BRANCHES message containing a list of all branches that have at least one operator who is registered to receive messages. The teller then initiates a QUERYALL message to server 15 requesting information from the list in server 15 about all operators who are registered to receive messages. The server responds with an ALLOPERS message. If a branch name was specified in the QUERYALL request, the server 15 sends back operator data only for operators signed on at that branch. If the branch name was not specified, then data is sent back for all operators registered in the list to receive messages. Having a list of operators the teller can then select a supervisor and send a remote override (RO) request directly to the supervisors workstation. As part of the override, the supervisor will enter operator ID and password which will be encrypted at the supervisors workstation and included in a RO APPROVAL message back to the workstation 11 of the requesting teller. The application in the requesting teller workstation 11 compares the encrypted passwords from server 15 and from the supervisor before acting on the override approval message.

Figure 7:
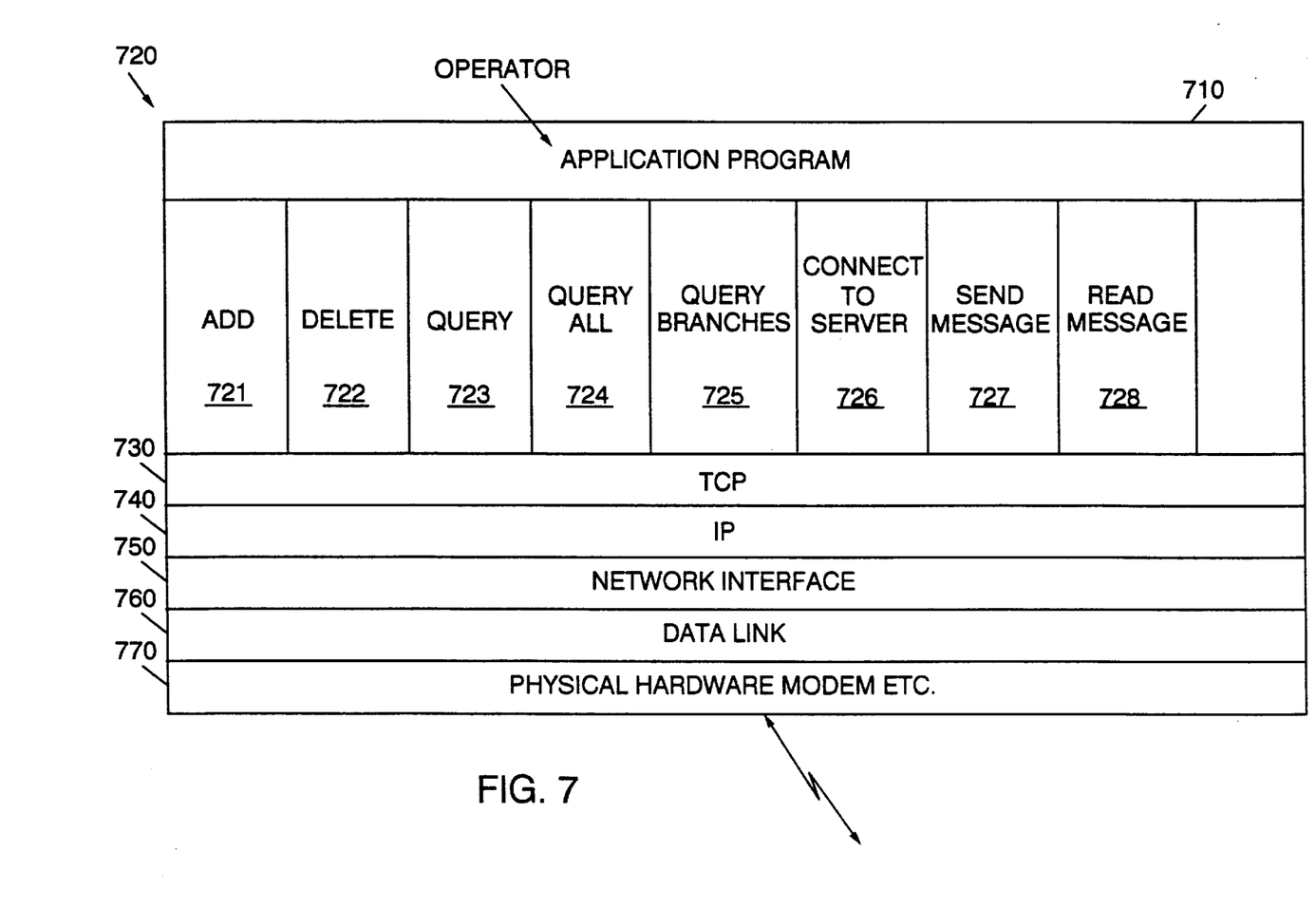
FIG. 7 is a block diagram of a DU client program of the invention.

FIG. 7 is a block diagram showing the DU client program of the invention in relation to other programs operating in a client computer workstation such as 11, 17 and 27. The operator interacts with an application program 710. The application program 710 uses the DU client program 720 functions which in turn act through TCP layer 730, IP layer 740, the network interface 750, the data link code 760 and the physical hardware 770 including modems and their microcode and device drivers.

The application program 710 calls the DU client program 720 module 721 of the invention whenever an operator signs on, calls module 722 whenever an operator signs off and calls one of the query modules 723, 724 or 725 when the operator needs to obtain the IP address of another operator at another computer workstation. As part of a sign-on, sign-off or query call, the DU client program 720 uses the connect to DU server module 726, send message module 727 and read message module 728 to pass various pieces of information to the local DU client for forwarding to the DU server, and the main DU server. During the sign-on call, the information passed to the DU client and forwarded to the DU server is shown in list form below:

| OPERATOR ID | OPERATOR IP ADDRESS |
| PORT NUMBER | MAIN DU SERVER IP ADDRESS |
| BRANCH NAME | |

During sign-off and query calls, a subset of this information is sent to the DU client and forwarded to the DU server. In the event that a computer workstation like workstation 11 in FIG. 1, has no main DU server, the MAIN DU SERVER IP ADDRESS is left blank.

In the event that the call is a sign on request, additional information may be provided in order to support functions such as remote override and/or license monitoring. The variables passed during sign-on in the preferred embodiment are:

| OPERATOR NAME | ENCRYPTED OPERATOR PASSWORD |
| ONLINE FLOOR LIMIT | OFFLINE FLOOR LIMIT |
| SUPERVISOR STATUS | OFFICER STATUS |
| (0 or 1) | (0 or 1) |
| OVERRIDE LEVEL | RUNNING PROGRAMS |

In one preferred embodiment, the DU list entry information need not be parsed by the DU client program or the DU server program of the invention but can be sent and stored and retrieved without processing and passed back to an application program for processing in the same way that such information is processed in other environments by application programs. In such cases, the remote override and license monitoring features of the invention are implemented in the application program 710. The read message module is used by the DU client program to read the ACK or NACK response from the DU server as well as messages from other workstations. Alternately, the running programs field could be extracted and tallied for program license information.

Figure 8:
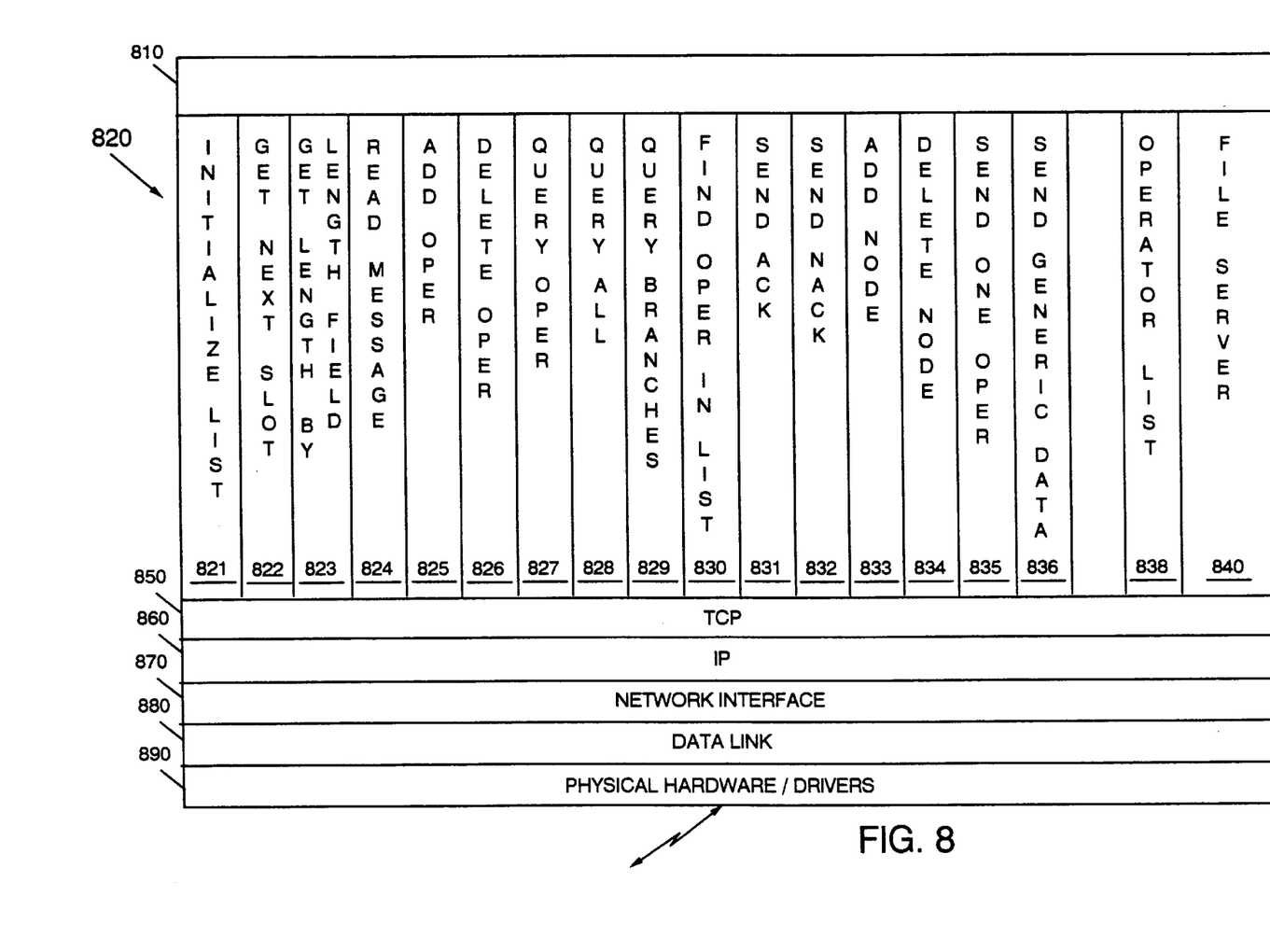
FIG. 8 is a block diagram of a DU server program of the invention.

FIG. 8 is a block diagram showing a DU server program 820 of the invention in relation to other programs operating in a server computer workstation such as workstations 15 and 25.

The DU server application program is the interface between the system managing operator and the server. The system managing operator sets up the system and initiates operation of the server using program 810. Program 810 calls DU server program 820 as necessary for set up such as invoking the initialize list module but thereafter, DU server program 820 runs on its own. The DU server program 820 functions which in turn act through TCP layer 850, IP layer 860, the network interface 870, the data link code 880 and the physical hardware 890 including modems and their microcode and device drivers.

Server workstation computers are continuously running while any other workstation is running, so it is advantageous to perform other services in the same computer 15 or 25 such as is provided by file server 840 Returning to the DU server program 820, the get next slot module 822 is invoked when a connect request is received from TCP to find available space in the connection array. The get length by length field 823 determines the length of the incoming data message. Read message 824 reads the incoming message. Add oper module 825 adds an operator to the list of operators in operator list 838. The Add oper module 825 is described by way of example in greater detail with respect to the flow diagram of FIG. 3.

The delete oper module 826 is described by way of example in greater detail with respect to the flow diagram of FIG. 4. Query oper module 827 searches the DU list 838 by calling find oper in list module 830 for a specifies operator and sends the operators information back to the DU client. Query all module 828 sends operator information about all operators back to the DU client 720. If a branch name was specified by the DU client 720, then only operators signed on to that branch are returned. The query branches module 829 sends a list of all branches that appear in the DU list 838 back to the DU client 720. The find operator in list module 830 searches the DU operator list for a specified operator.

Figure 11:
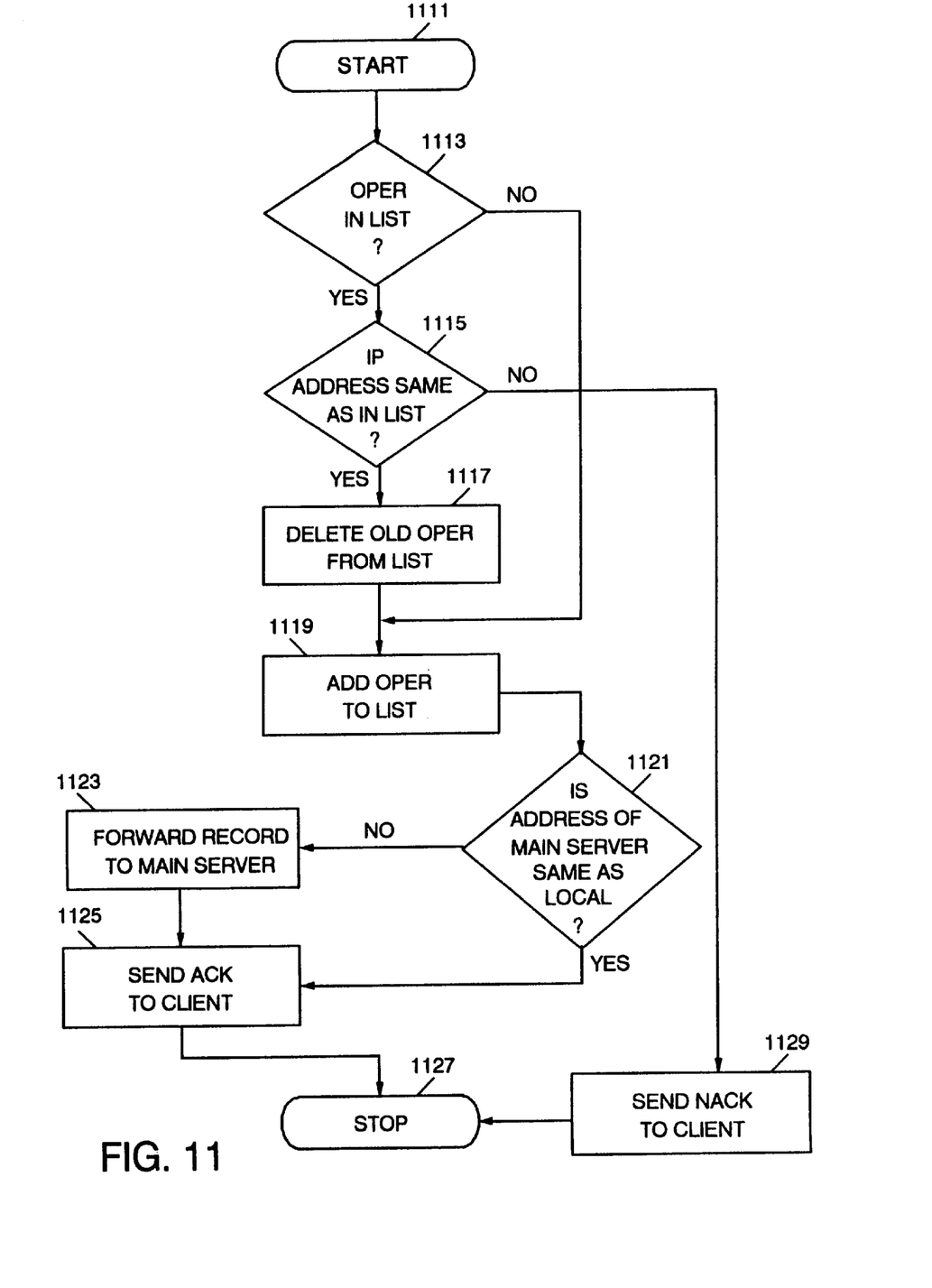
FIG. 11 is a flow diagram of the DU server program of FIG. 8 performing the message flows of FIGS. 3 and 4.

The send ACK module 831 sends an acknowledge response as shown at block 1125 in FIG. 11. The send NACK module 832 sends a not acknowledge response as shown at block 1129 in FIG. 11.

The add node module 833 adds operator information to the list 838 after the add operator module 825 completes its logic. The delete node module deletes operator information from list 838 after delete operator module 826 completes its logic. The send one operator module 835 formats and sends the information about the one specified operator back to the DU Client 720. The send generic data module 836 sends a data message that has been formatted by the calling module, such as application 810, back to the DU client 720.

The list of operator names is a forward and backward linked list of names. Each entry starts with a pointer to the previous operator entry and a pointer to the next operator entry as shown below in tabular form.

PREVIOUS OPERATOR
NEXT OPERATOR
OPERATOR ID
IP ADDRESS
PORT

BRANCH NAME
LENGTH OF USER DATA
USER DATA

The user data field may contain additional information useful for many purposes at little extra cost since the operator IP address information is being collected anyway. One example is the running program information discussed earlier with respect to FIG. 7.

Figure 9:
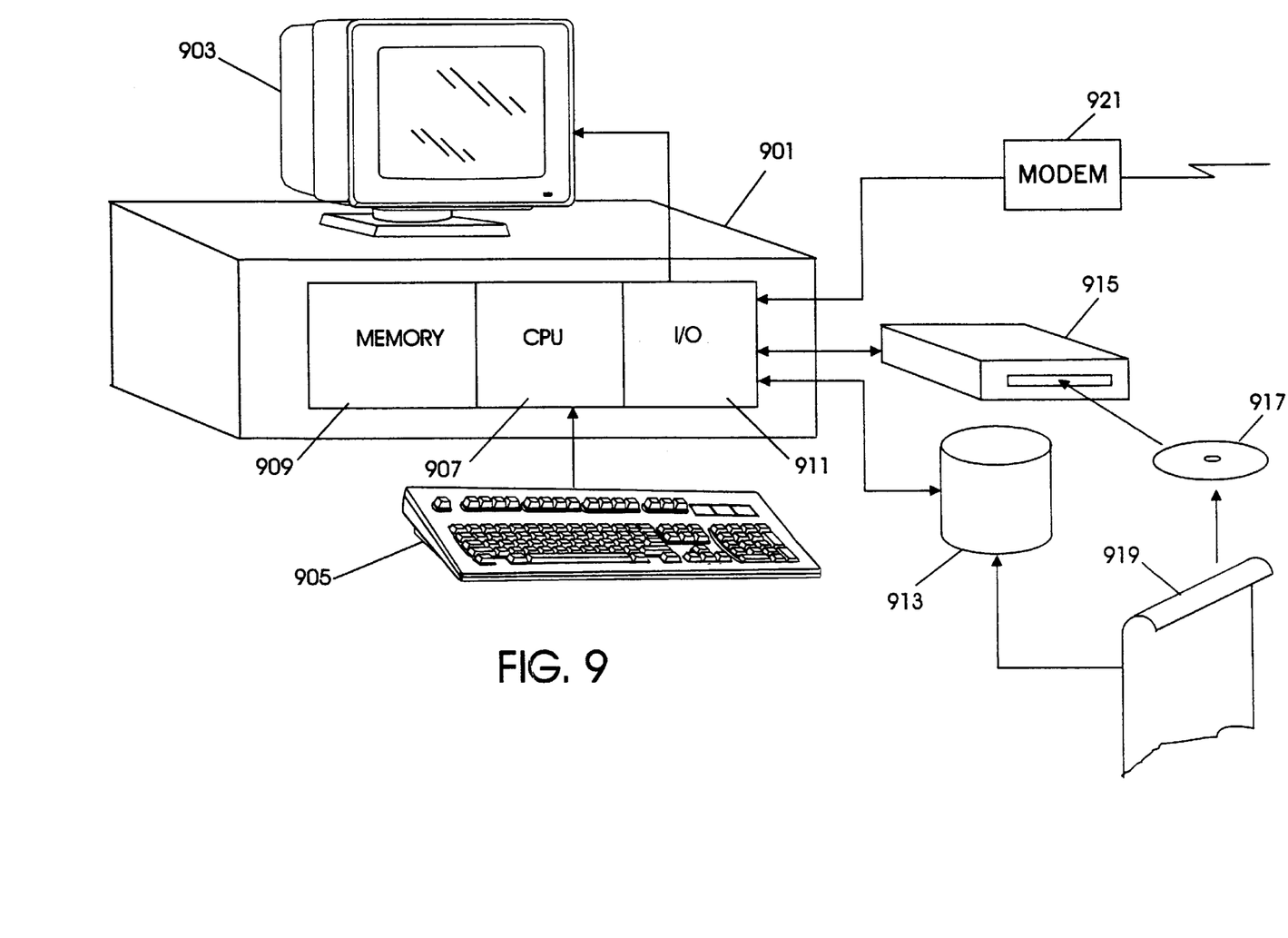
FIG. 9 is a block diagram of a workstation according to the invention.

FIG. 9 is a block diagram of a workstation according to the invention. The hardware shown in FIG. 9 can be used to implement any of the workstations 11, 15, 17, 25 and 27 in FIGS. 1 and 2. The workstation comprises a computer 901, a display 903, and a keyboard 905. The computer 901 has a memory 909 which may include RAM, ROM, cache, flash and other forms of direct access storage to hold the programs and data for central processing unit (CPU) 907. Computer 901 also has a number of I/O adapter circuits 911 for connecting input and output devices such as printers (not shown), modem 921, hard disk 913 and CDROM or diskette drive 915. The operating system and other control programs for the workstation are usually stored on hard disk 913 where they are easily accessible during initial program load (IPL) and afterwards. The application programs and the DU client program and DU server program of this invention would normally be installed onto the workstation by a removable media 917 in the form of a diskette or a CDROM. The DU client program of FIG. 7 and the DU server program of FIG. 8 are represented by program listing 919. One of these DU programs of this invention is loaded into computer 901, preferably via removable media 917. After being loaded, a copy can be permanently stored on hard disk 913 for IPL thereafter.

Figure 10:
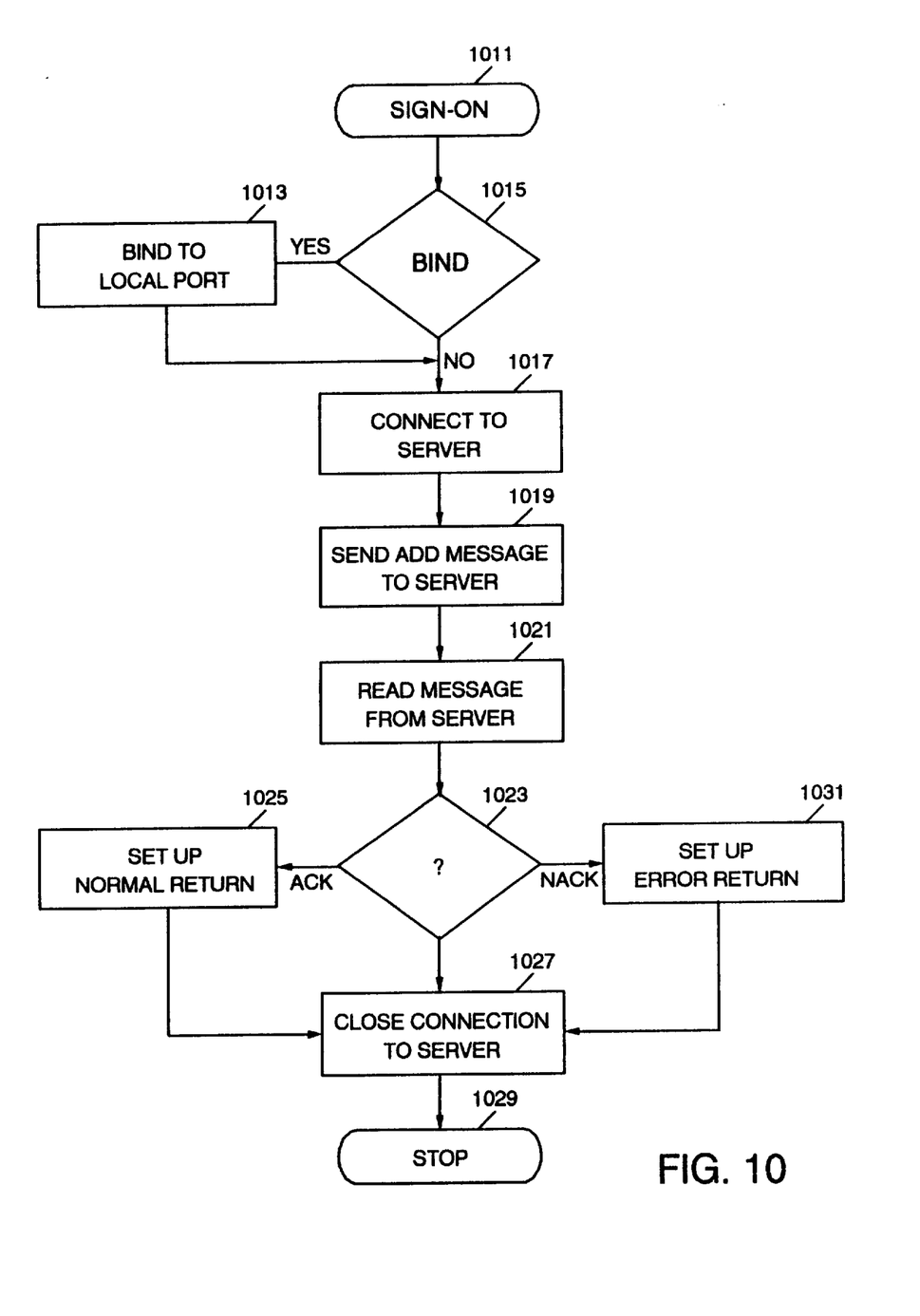
FIG. 10 is a flow diagram of the client program of FIG. 7 performing the message flows of FIGS. 3 and 4.

FIG. 10 is a flow diagram of the DU client program 720 of FIG. 7 performing the message flows of FIGS. 3 and 4. At block 1011, an operator sign-on occurs at a workstation. Decision block 1015 determines whether to bind the application to a local TCP/IP port. The binding to a local port occurs at block 1013. After the workstation is bound to a TCP/IP port, the DU client program, at block 1017, initiates the connection to the DU server 15. Then at block 1019 an ADD request message is assembled and sent to server 15. The DU server will act on the ADD request as described with respect to FIG. 11 and will respond with an ACK or NACK message to be read at block 1021 by the DU client program. If the response was an ACK as determined at decision block 1023, a normal return from the DU client program is set up at block 1025 and the connection to the DU server is closed at block 1028. Control of the workstation computer 11 then returns to the application program as the DU client program stops at block 1029.

If the response was a NACK as determined at decision block 1023, an error return from the DU client program is set up at block 1031 and again the connection to the DU server is closed at block 1028. Control of the workstation computer 11 then returns to an error routine program as the DU client program stops at block 1029.

FIG. 11 is a flow diagram of the DU server program of FIG. 8 performing the message flows of FIG. 3. Block 1111 is the start of this program in a server 15 or 25 as the ADD request message is received from a workstation 11, 17 or 27. At decision block 1113, the name list is accessed and if the operator name is in the list already, control moves to decision block 1115 where the IP address associated with the operator name is examined. If the IP address that came in with the ADD request message is not the same as already stored in the list, the operator signing on is already signed on somewhere else and flow goes to block 1129 to send NACK to the client workstation. If at block 1115, the IP address is found to be the same as was received with the ADD request, the workstation may have hung up and the operator turned it off and back on. In that circumstance, the operator is again signing on but did not sign off. To permit such recovery, the program deletes the old operator entry at block 1117. These steps, 1115 and 1117 normally will not be necessary as a DELETE request will have normally removed the operator entry as the operator signed off of the workstation previously being used. If at block 1113 the operator name was not found in the DU list, or after deleting the entry if it was found, a new entry is made into the DU list at block 1119. The fields of the new entry are described earlier with respect to FIG. 8.

At decision block 1121, the DU server examines the IP address of the main DU server 25 and compares the main DU server IP address with its own, that is, the address of workstation 15. If they are different, then the DU server running this program is server 15 and the entry for this operator must also be forwarded to the main DU server at workstation 25 which occurs at block 1123. If the addresses are the same, then the server running this program is server 25 and the entry need not be forwarded.

After forwarding if the addresses are different, or after determining that they are the same, an ACK response message is sent back at block 1125 to the DU client program described with respect to FIG. 10. The DU server program 720 then continues to wait for another request.

Figure 12:
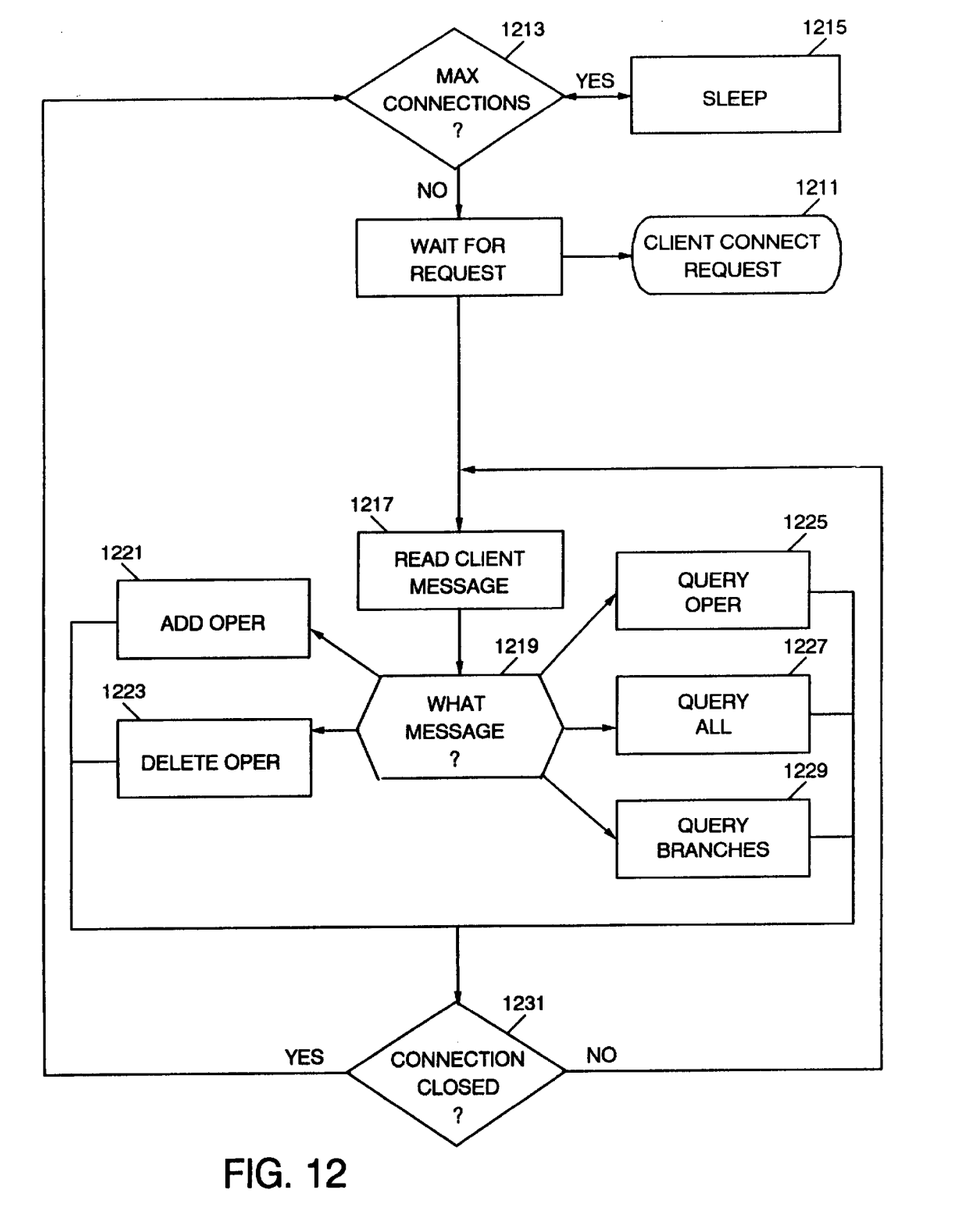
FIG. 12 is a flow diagram of the DU server program of FIG. 8 performing the message flows of FIGS. 5 and 6.

FIG. 12 is a flow diagram of the DU server program 820 of FIG. 8 performing the message flows of FIGS. 5 and 6. Flow starts at block 1211 where a workstation 11, 17 or 27 attempts to connect to the DU server. A decision is made at block 1213 whether a slot in the connection array is available. If none is available, the DU server program 820 waits briefly and then checks again for a slot to become available.

If a slot in the connection array is available, the connection is processed by reading the message from the DU client program at block 1217. At block 1219, the message is parsed to determine what function is be performed. The functions are add operator to the list at block 1221, delete operator from the list at 1223, query operator at block 1225, query all operators at block 1227 and query branches at block 1229. After one of these functions have been performed in response to the message from the DU client program, flow proceeds to block 1231 to determine whether there are more messages. If there are more messages, control returns to block 1217 to read the next message. If there are no more messages, the connection is closed and the process returns to block 1213 to check for available connections. If none are available, the process sleeps at block 1215 for a time period and retries the connections. If a connection is available, the process moves to block 1210 where it waits for the next client connect request.

While the invention has been shown and described with reference to particular embodiments thereof, it will be understood by those skilled in the art that the foregoing and other changes in form and detail may be made therein without departing from the spirit and scope of the invention.

What is claimed is:

1. Method for locating operators at computer workstations served by an internetting protocol communication network comprising the acts of:

sending an add message from a workstation to a dynamic user identification server when an operator signs on to a workstation;

storing an operator identification and internetting protocol workstation address at the dynamic user identification server for each operator that is signed on to a workstation;

sending a delete message from a workstation to the dynamic user identification server when an operator signs off from a workstation;

deleting the operator identification and internetting protocol workstation address from the dynamic user identification server for each operator that has signed off from a workstation;

sending a query from a workstation to the dynamic user identification server when a message is to be sent to an operator at another workstation;

receiving the operator identification and internetting protocol workstation address for the operator from the dynamic user identification server;

sending a message from the workstation to the another workstation using the internetting protocol workstation address received from the dynamic user identification server.

2. Method of claim 1 further comprising at the dynamic user identification server, the act of:

storing an operator identification, encrypted password and internetting protocol workstation address at the dynamic user identification server for each operator that is signed on to a workstation further comprises storing information concerning the programs being run at each workstation that has an operator signed on.

3. Method of claim 2 further comprising the acts of:

counting the number of copies of each program being run at the workstations that have an operator signed on;

reporting the number of copies being run.

4. Method for locating operators at computer workstations served by an internetting protocol communication network comprising the acts of:

sending an add message from a workstation to a dynamic user identification server when an operator signs on to a workstation;

storing an operator identification, encrypted password and internetting protocol workstation address at the dynamic user identification server for each operator that is signed on to a workstation;

sending a delete message from a workstation to the dynamic user identification server when an operator signs off from a workstation;

deleting the operator identification, encrypted password and internetting protocol workstation address from the dynamic user identification server for each operator that has signed off from a workstation;

sending a query from a workstation to the dynamic user identification server when a message is to be sent to an operator at another workstation;

receiving the operator identification, encrypted password and internetting protocol workstation address for the operator from the dynamic user identification server;

sending a message from the workstation to the another workstation using the internetting protocol workstation address received from the dynamic user identification server.

5. Method of claim 4 wherein the message from the workstation to the another workstation is a remote override request, further comprising the acts of:

receiving from the another workstation an override approval response including a supervisor operator identification, an encrypted supervisor password and approval message.

6. Method of claim 4 further comprising at the dynamic user identification server, the act of:

storing an operator identification, encrypted password and internetting protocol workstation address at the dynamic user identification server for each operator that is signed on to a workstation further comprises storing information concerning the programs being run at each workstation that has an operator signed on.

7. Method of claim 6 further comprising the acts of:

counting the number of copies of each program being run at the workstations that have an operator signed on;

processing a royalty report regarding the number of copies being run.

8. A client workstation comprising:

a computer workstation connected to a packet switched network;

means for sending an add message from the workstation to a dynamic user identification server when an operator signs on to the workstation, the add message including an operator identification, encrypted password and internetting protocol workstation address for storage at the dynamic user identification server;

means for sending a delete message from the workstation to the dynamic user identification server when an operator signs off from the workstation the delete message including the operator identification and encrypted password for use by the dynamic user identification server to verify operator identity prior to deleting the operators operator identification, encrypted password and internetting protocol workstation address from storage at the dynamic user identification server;

means for sending a query from the workstation to the dynamic user identification server when a message is to be sent from the workstation to an operator at another workstation;

means for receiving the operator identification, encrypted password and internetting protocol workstation address for the operator at the another workstation from the dynamic user identification server;

means for sending a message from the workstation to the another workstation using the internetting protocol workstation address received from the dynamic user identification server.

9. The computer workstation of claim 8 further comprising:

means for receiving from the another workstation an override approval response including a supervisor operator identification, an encrypted supervisor password and approval message, in response to the message to the another workstation.

10. A dynamic user identification server workstation comprising:

a computer workstation connected to client workstations by a packet switched network;

means for receiving an add message from client workstations when an operator signs on to one of the client workstations, the add message including an operator identification, encrypted password and internetting protocol workstation address;

means for storing the operator identification, encrypted password and internetting protocol workstation address in a list at the dynamic user identification server;

means for receiving a delete message from one of the workstations when an operator signs off from the one of the client workstations, the delete message including the operator identification and encrypted password of the operator who has signed off;

means for verifying the identity of the operator who has signed off;

means for deleting the operator identification, encrypted password and internetting protocol workstation address for the operator who has signed off from the list stored at the dynamic user identification server after verifying identity of the operator who has signed off;

means for receiving a query from a third workstation when a message is to be sent from the third workstation to a second operator at a second workstation whose internetting protocol workstation address is unknown at the third workstation;

means for sending to the third workstation, the operator identification, encrypted password and internetting protocol workstation address for the second operator at the second workstation.

11. The dynamic user identification server workstation of claim 10 further comprising:

means for storing information concerning the programs being run at each workstation that has an operator signed on.

12. The dynamic user identification server workstation of claim 11 further comprising:

means for counting the number of copies of each program being run at the workstations that have an operator signed on;

means for reporting the number of copies being run.

13. A computer program storage medium readable by a computer and encoding a program of instructions for executing a computer process to provide for communication using internetting protocol between users of computers, each computer having a continuously running computer application program that allows users to sign on and off the computer application program without stopping the computer application program comprising the steps of:

sending an add message from a first computer to a dynamic user identification server computer when an operator signs on to the first computer, the add message including an operator identification, encrypted password and internetting protocol workstation address for storage at the dynamic user identification server;

sending a delete message from the first computer to the dynamic user identification server when an operator signs off from the first computer, the delete message including the operator identification and encrypted password for use by the dynamic user identification server to verify operator identity prior to deleting the operators operator identification, encrypted password and internetting protocol workstation address from storage at the dynamic user identification server;

sending a query including a second operator identification from the first computer to the dynamic user identification server when a message is to be sent from the first computer to an operator at a second computer;

receiving an operator identification, encrypted password and internetting protocol workstation address for the operator at the second computer from the dynamic user identification server;

sending a message from the first computer to the second computer using the internetting protocol address received from the dynamic user identification server.

14. The computer program storage medium of claim 13 wherein said computer process further comprises the steps of:

receiving from the second computer an override approval response including a supervisor operator ID, an encrypted supervisor password and approval message, in response to the message to the second computer.

15. A computer program product comprising:

a computer useable medium having computer readable code embodied therein for the dynamic mapping of user identification into an IP address, said computer program product comprising:

computer readable program code devices configured for sending an add message from a first computer to a dynamic user identification server computer when an operator signs on to the first computer, the add message including an operator identification, encrypted password and internetting protocol workstation address for storage at the dynamic user identification server;

computer readable program code devices configured for sending a delete message from the first computer to the dynamic user identification server when an operator signs off from the first computer, the delete message including the operator identification and encrypted password for use by the dynamic user identification server to verify operator identity prior to deleting the operators operator identification, encrypted password and internetting protocol workstation address from storage at the dynamic user identification server;

computer readable program code devices configured for sending a query including a second operator identification from the first computer to the dynamic user identification server when a message is to be sent from the first computer to an operator at a second computer;

computer readable program code devices configured for receiving an operator identification, encrypted password and internetting protocol workstation address for the operator at the second computer from the dynamic user identification server;

computer readable program code devices configured for sending a message from the first computer to the second computer using the internetting protocol address received from the dynamic user identification server.

16. A computer program product comprising:

a computer useable medium having computer readable code embodied therein for the dynamic mapping of user identification into an IP address, said computer program product comprising:

computer readable program code devices configured for receiving an add message from a client computer when an operator signs on, the add message including an operator identification, encrypted password and internetting protocol address;

computer readable program code devices configured for storing the operator identification, encrypted password and internetting protocol address in a list;

computer readable program code devices configured for receiving a delete message from a client computer when an operator signs off from the client computer, the delete message including the operator identification and encrypted password of the operator who has signed off;

computer readable program code devices configured for verifying the identity of the operator who has signed off;

computer readable program code devices configured for deleting from the list, the operator identification, encrypted password and internetting protocol workstation address for the operator who has signed off after verifying identity of the operator who has signed off;

computer readable program code devices configured for receiving a query from a third computer when a message is to be sent from the third computer to a second operator at a second computer whose internetting protocol address is unknown at the third computer;

computer readable program code devices configured for sending to the third computer, the operator identification, encrypted password and internetting protocol address for the second operator at the second computer.

* * * * *